United States Patent Office — 3,373,112, Patented Mar. 12, 1968

3,373,112
TRIS(HYDROCARBYL ALKYLENE POLYAMINES)
AS LUBRICATING OIL DETERGENTS
Robert Gordon Anderson, Novato, and Yngve G. Hendrickson, El Cerrito, Calif., assignors to Chevron Research Company, San Francisco, Calif., a corporation of Delaware
No Drawing. Filed May 18, 1966, Ser. No. 550,897
10 Claims. (Cl. 252—51.5)

ABSTRACT OF THE DISCLOSURE

Tris(aliphatic hydrocarbon substituted alkylene polyamines) bonded to a central nucleus, finding use as lubricating oil detergents.

This invention concerns novel high molecular weight polyamines having a plurality of hydrocarbyl polyamines emanating from a central nucleus, the compositions finding use as detergents.

The formation of deposits and sludge remains a continuing problem in the smooth operation of internal combustion engines. The lubricated parts in the engine, such as the piston rings, must be maintained relatively free of deposits. The lubricating oil must therefore not only lubricate the parts but retain, dispersed in the oil, any sludge which is formed. Therefore, detergents are generally included in the oil to maintain the sludge in suspended condition and prevent its decomposition onto the engine.

However, even if a detergent is able to maintain deposits suspended in solution, to be satisfactory, the detergent itself must not significantly enhance the formation of sludge and deposits. Under the harsh conditions present in internal combustion engines, compounds which have good detersive capability are frequently found to be unacceptable because of the greatly enhanced formation of deposits resulting from their decomposition.

Pursuant to this invention, compositions having excellent detersive capability are provided which are high molecular weight polyamines of from about 1,500 to 15,000 molecular weight, having at least 2 basic amino nitrogens and at least 2 long aliphatic hydrocarbon chains, each of at least about 400 molecular weight (approximately 30 carbon atoms) radiating from a central moiety or nucleus, the long chain hydrocarbon group being associated with a basic nitrogen. Particularly, the long aliphatic hydrocarbon chains are bonded to amino groups which in turn are bonded to a central polyfunctional radical which acts as a nucleus for the long chain groups.

Usually, the compositions will have molecular weights in the range of about 2,000 to 10,000, more usually in the range of about 2,000 to 9,000. The number of amine nitrogen atoms will usually be at least 2, more usually at least 3, and generally not exceed 24 nitrogen atoms. The total number of nitrogen atoms may range as high as 30 nitrogen atoms. The long chain aliphatic hydrocarbon groups will generally be from about 400 to about 4,500 molecular weight, more usually from about 450 to 3,000 molecular weight.

For the most part, the compositions of this invention are described by the following formula:

The above formula may be divided into three parts: A concerns the central moiety; [NL]$_n$N concerns the alkylene polyamine; (X)$_x$ and R$_r$H$_{2+n-r}$ concern the substituents bonded to the nitrogen atoms of the alkylene amine. A is a di- or tetravalent, usually trivalent, organic radical composed primarily of carbon, hydrogen and nitrogen having from about 3 to 15 carbon atoms, more usually from about 6 to 12 carbon atoms and from 0 to 3 nitrogen atoms. The radical A may be acyclic:aliphatic, or cyclic:alicyclic, aromatic or heterocyclic, having as the heteroatoms nitrogen atoms.

Illustrative radicals named as the parent compound are propane, hexane, cyclohexane, benzene, triazine, trimethylamine, trimethyltriazine, pyrimidine, etc.

X will be non-oxo carbonyl or an imino group, i.e., C=NH, usually non-oxo carbonyl, while $n$ will be an integer of from 0 to 1. That is, the amino groups may be bonded directly to the nucleus or through a non-oxo carbonyl or carboxy group to form an amide, or imino group to form an amidine. In the reaction between an alkylene diamine and a carboxy group, functionalities other than amides may be formed, a.e., imidazolines.

L is an alkylene group of from about 2 to 6 carbon atoms, more usually of from about 2 to 3 carbon atoms. Illustrative alkylene groups are hexamethylene, ethylene, propylene, butylene, 1-ethylethylene, etc. $n$ is an integer of from 1 to 6, more usually of from 1 to 5.

Illustrative alkylene amine groups are ethylene diamine, diethylene triamine, triethylene tetramine, tetraethylene pentamine, pentaethylene hexamine, propylene diamine, dipropylene triamine, tetramethylene diamine, hexamethylene diamine, etc.

R is an aliphatic hydrocarbon radical, saturated or having aliphatic unsaturation, straight chain or preferably branched chain, having from about 30 to 350 carbon atoms (about 400 to 5,000 molecular weight), more usually from about 50 to 225 carbon atoms (about 700 to 3,000 molecular weight).

These aliphatic hydrocarbon groups are most readily obtained by the polymerization of low molecular weight olefins, i.e., 2 to 6 carbon atoms. Illustrative olefins include ethylene, propylene, isobutylene, butene-1, 4-methylpentene-1, hexene-1, etc. The preferred monomers are propylene and isobutylene, particularly isobutylene.

$r$ is an integer of from 1 to 2, usually about 1 for each molecule. However, averaging over all molecules, $r$ may frequently be somewhat greater than 1, but usually not greater than about 1.5.

$m$ is an integer of from 2 to 4, usually about 3. That is, in each molecule $m$ is an integer but averaging over all molecules $m$ may be a fractional number, generally in the range of about 2 to 4, and most usually about 3.

While the major components of the compositions of this invention are described by the formulae, frequently there will be small amounts of other products present in the compositions of this invention as well as incompletely reacted starting material. That is, with the polyfunctional nuclei, some of the material in the final product may be incompletely reacted with only two of three or three of four of the functional groups being reacted. However, for the most part, these will be only minor components and will not significantly affect the properties of the compositions of this invention. Also, as already indicated, occasionally with the non-oxo carbonyl derivatives, imidazolines may be formed.

The preferred compositions of this invention have the following formula:

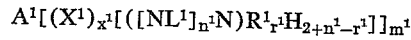

wherein $A^1$ is a trivalent organic radical of from 3 to 12 carbon atoms and from 0 to 3 nitrogen atoms, $X^1$ is non-oxo carbonyl, $x^1$ is an integer of from 0 to 1, $L^1$ is an alkylene group of from 2 to 6 carbon atoms, $n^1$ is an integer of from 1 to 5, $R^1$ is an aliphatic hydrocarbon radical of from 400 to 3,000 molecular weight, more usually of from 750 to 3,000 molecular weight and $r^1$ is an integer of from 1 to 2, averaging over the total composition at less than 2 and equal to or greater than 1, and $m^1$ is an integer of from 2 to 4, usually 3. The molecule will generally have at least about 6 nitrogen atoms, at least 3 of which are basic amino nitrogen atoms.

Preferred aspects of the compositions of this invention have $A^1$ as a polyvalent aliphatic radical of from about 3 to 12 carbon atoms and 0 to 1 amine nitrogen atoms, a polyvalent carbocyclic ring of from 5 to 10 annular members, or a polyvalent heterocyclic radical of from 1 to 3 nitrogen annular members and a total of from 5 to 7 annular members. These preferred aspects will be more specifically described in the subsequent formulas.

The compositions of this invention will be divided into three subgenera: those in which A is aliphatic, carbocyclic—both alicyclic and aromatic—and heterocyclic. The first subgenera in which A is aliphatic are compositions of the following formula:

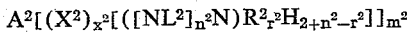

wherein $A^2$ is a polyvalent radical of from 3 to 12 carbon atoms, more usually of from 3 to 9 carbon atoms having from 0 to 1 nitrogen atoms. $X^2$ is non-oxo carbonyl, while $x^2$ is an integer of from 0 to 1. $L^2$ is alkylene of from 2 to 6 carbon atoms, more usually of from 2 to 3 carbon atoms and $n^2$ is an integer of from 1 to 6, more usually of from 1 to 5. $R_2$ is aliphatic hydrocarbon of from about 400 to 3,000 molecular weight, while $r^2$ is an integer of from 1 to 2 and generally averaging over the entire composition less than 2 and equal to or greater than 1. $m^2$ is an integer of from 2 to 4, most usually about 3.

The next subgenus is that in which the nucleus is carbocyclic. These compositions have the following formula:

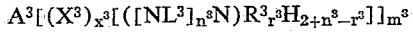

wherein $A^3$ is a polyvalent carbocyclic ring radical of from 5 to 10 annular members, more usually of from 5 to 6 annular members, having from 5 to 12 carbon atoms, usually 6 to 10 carbon atoms, the valences usually being separated by at least 3 carbon atoms. $X^3$ is non-oxo carbonyl, while $x^3$ is an integer of from 0 to 1. $L^3$ is alkylene of from 2 to 6 carbon atoms, more usually of from 2 to 3 carbon atoms and $n^3$ is an integer of from 1 to 6, more usually of from 1 to 5. $R^3$ is aliphatic hydrogen of from about 400 to 3,000 molecular weight, while $r^3$ is an integer of from 1 to 2 and generally averaging over the entire composition less than 2 and equal to or greater than 1. $m^3$ is an integer of from 2 to 4, most usually about 3.

The last subgenus is that in which the nucleus is heterocyclic, having nitrogen as its only heteroatoms. These compositions have the following formula:

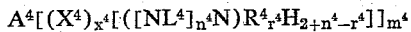

wherein $A^4$ is a polyvalent heterocyclic radical having from 1 to 3 nitrogen annular members as its only heteroatoms and a total of from 5 to 10 annular members, having 3 to 9 carbon atoms, more usually from 3 to 6 carbon atoms and the valences are usually separated by at least 3 atoms—carbon or nitrogen. $X^4$ is non-oxo carbonyl, while $x^4$ is an integer of from 0 to 1. $L^4$ is alkylene of from 2 to 6 carbon atoms, more usually of from 2 to 3 carbon atoms and $n^4$ is an integer of from 1 to 6, more usually of from 1 to 5. $R^4$ is aliphatic hydrocarbon of from about 400 to 3,000 molecular weight, while $r^4$ is an integer of from 1 to 2 and generally averaging over the entire composition less than 2 and equal to or greater than 1. $m^4$ is an integer of from 2 to 4, most usually about 3.

Depending on whether x is 0 or not—whether the product is a carboxamide or not—the compositions are prepared in different ways. When the product is joined to the nucleus as an amine rather than amide group, active halogen containing compounds will be used. The active halogen containing compound may be aliphatic, alicyclic, aromatic or heterocyclic. The polyamine and halo compound will be contacted, generally in the presence of an inert polar solvent, at elevated temperatures, usually in the range of about 100° to 200° C. Stoichiometric quantities of the polyamine and halo compound will be used. That is, one mole of polyamine will be used for each equivalent of halogen to be displaced.

Illustrative halogen containing compounds are trichloropropene, pentachloropropene, 1,3,5 - trichloropentane, 1,3,5 - trichlorocyclohexane, 1,3,5 - tribromocyclohexane, 1,3,4-tribromocyclopentadiene, 1,3,5 - tri(chloromethyl) benzene, 2,4,6-cyanuric chloride, etc.

When x is 1, the derivative will be carboxamides. For the most part, the esters or acyl halides will be used with the respective aliphatic hydrocarbon substituted alkylene polyamines. The reaction will be carried out by combining the reactants either neat or in the presence of an inert solvent, generally at temperatures in the range of about 100° to 225° C. Times of reaction will vary widely, generally being from about one hour to about 24 hours, usually fewer than 12 hours. Usually, the carboxy groups will be separated by at least 3 carbon atoms.

Rather than refer to the ester or the acyl halide, the parent carboxylic acid will be named for the illustrative compounds. Illustrative acids include 1,3,5-pentane tricarboxylic acid, 1,3,5-cyclohexane tricarboxylic acid, trimesic acid, 2,4,6-triazine triacetic acid, nitrilo triacetic acid, nitrilo tripropionic acid, ethylene diamine tetraacetic acid, etc.

Preferred reactant compositions are cyclic compositions having 6 annular members and of from 3 to 12 carbon atoms. These reactants for the most part have the following formula:

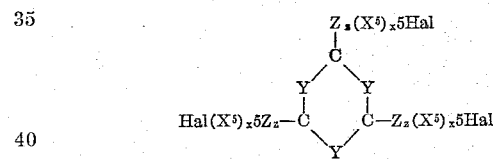

wherein Y is carbon or nitrogen, Z is alkylene of from 1 to 3 carbon atoms, z is an integer of from 0 to 1, $X^5$ is non-oxo carbonyl, $x^5$ is an integer of from 0 to 1 and Hal is halogen of atomic number 17 to 35, i.e., chlorine and bromine, when $x^5$ is 0 and halogen or lower alkoxy when $x^5$ is 1 and the remaining valences are satisfied by unsaturation or hydrogen atoms. The carbocyclic nuclei include benzene, pyridine, pyrimidine, triazine, etc.

As already indicated, the compositions of this invention may be prepared neat or in an inert solvent. The solvents may be hydrocarbon or polar. Illustrative solvents include benzene, toluene, xylene, cumene, dioxane, the dimethyl ether of ethylene glycol, dimethyl sulfoxide, cellosolve, methanol, ethanol, pyridine, etc. The concentration of the reactants may vary from one weight percent to about 75 weight percent, the particular concentration not being critical to this invention. When the reaction is between a halo compound and an amine, usually after the reaction has gone to completion, the hydrohalide formed will be removed in a conventional manner. Conveniently, the composition may be treated with low molecular weight amine to form the hydro-halide and the resultant amine salt separated from the product. When the reaction is with an ester, the alcohol which is formed can generally be distilled off from the reaction mixture.

The reaction can be carried out at ambient pressures and can be run batch-wise or continuously.

The amine reactants have for the most part the following formula:

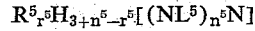

wherein $R^5$ is aliphatic hydrocarbon of from 400 to 3,000 molecular weight, $r^5$ in any molecule is 1 or 2 but over the entire mixture will generally average less than 2 and equal to or greater than 1, and $L^5$ is alkylene of from 2 to 6 carbon atoms, more usually alkylene of from 2 to 3 carbon atoms.

Illustrative aliphatic hydrocarbon substituted alkylene polyamines are polypropylene ethylene diamine, polyisobutylene ethylene diamine, polyisobutylene trimethylene diamine, polyisobutylene triethylene tetramine, polyisobutylene diethylene triamine, polyisobutylene tetraethylene pentamine, polyisobutylene pentaethylene hexamine, polypropenyl dipropylene triamine, etc.

The following examples are offered by way of illustration and not by way of limitation.

*Example A.—Preparation of aliphatic hydrocarbon substituted alkylene diamine*

The preparation of the aliphatic hydrocarbon substituted alkylene diamines may be found in copending application Ser. No. 481,916, filed Aug. 23, 1965. The following preparation is therefore only exemplary of the general method of preparation of aliphatic hydrocarbon substituted alkylene polyamines.

Into a reaction flask was charged 1,156 g. of chloropolyisobutylene (polyisobutylene of approximately 950 molecular weight chlorinated to 7.8 weight percent chlorine), 75 ml. of xylene and 330 ml. of ethylene diamine, followed by the addition of 330 ml. of n-butanol. The temperature of the mixture was then raised over a period of about one hour to about 100° C., followed by raising the temperature to about 160° C. and maintaining it for about 4.5 hours. During this time, about 330 ml. of distillate was taken overhead. The reaction mixture was then transferred to a separatory funnel with the air of one liter of benzene and the mixture washed repeatedly: first with a dilute aqueous solution of isopropyl alcohol, then with a dilute aqueous solution of a combination of isopropyl alcohol and butanol and finally with water. The volatile materials were removed from a sample of the washed product by sparging with nitrogen to a constant weight on a steam plate. Analysis: titrametric equivalent wt.=806, equal to 1.74% N; wt. percent C=0.62.

*Example I*

Into a reaction flask was introduced 1,590 g. (1.21 moles) of polyisobutylene ethylene diamine (percent N, approx. 2.12) in a nitrogen atmosphere and the temperature raised to 120° C. To the hot amine was added 137 g. (0.403 mole) of triethyl 2,4,6-triazine triacetate and the temperature raised to about 150° C. while maintaining a slight nitrogen stream through the mixture. After about 1.25 hours at this temperature, the temperature was further raised to 160° C. and held for approximately 0.5 hours. The mixture was then allowed to cool, leaving a residue weighing 1,699 g. An infrared spectrum was consistent with the product being the triamide. Analysis: Percent N, 2.72, 273; percent basic N, 1.00, 1.03. (Basic N is determined by titration with perchloric acid in methyl isobutyl ketone.)

*Example II*

Into a reaction vessel having a nitrogen atmosphere was introduced 33.6 g. (0.122 mole) of triethyl nitrilo triacetate (N(CH$_2$CO$_2$C$_2$H$_5$)$_3$) and 426 g. of polyisobutylene ethylene diamine (0.34 mole) and the mixture heated to about 180° C. and maintained at that temperature for about 2 hours. The temperature was then raised to 205° C. and held at that temperature for 4 hours. During the reaction, a slow nitrogen stream was bubbled through the mixture. The reaction mixture was then allowed to cool to room temperature and weighed, yielding 433 g. The infrared spectrum was consistent with the triamide product. Analysis: Percent N, 2.33, 2.33; percent basic N, 0.68, 0.68.

*Example III*

Into a reaction flask was introduced 510 g. (0.40 mole) of polyisobutylene ethylene diamine and 300 ml. of 1,4-dioxane, followed by the addition of 27.5 g. of cyanuric chloride in 250 ml. of 1,4-dioxane. The reaction mixture was kept under a nitrogen atmosphere and a slow stream of nitrogen passed through the mixture. The mixture was heated to refluxing and maintained at that temperature for 2 hours, followed by raising the temperature to 175° C. and distilling off the dioxane. The pressure was then reduced to about 4–5 mm. Hg while the temperature was maintained at 175° C. After allowing the mixture to cool, the product was weighed, yielding 527.5 g. An infrared spectrum was consistent with the triamine product. Analysis: Percent N, 3.38, 3.40.

To the above product was added 500 ml. of mixed hexanes and heated to about 55° C. yielding a homogeneous solution. To this solution was added 350 ml. of 95 percent ethanol and the mixture heated to reflux and maintained at that temperature for about 30 minutes. At the end of this time, 150 ml. of 10 percent aqueous sodium carbonate was added, refluxing continuing for 15 minutes following the addition.

The mixture was allowed to cool and settle and the aqueous layer drawn off. The organic layer was then distilled, first at atmospheric pressure at pot temperatures in the range of 60°–110° C., followed by reducing the pressure to about 4–5 mm. Hg and raising the pot temperature to 149° C.

The residual product weighed 492 g. Analysis: Percent N, 3.34, 3.38; percent basic N, 0.80.

*Example IV*

Into a reaction flask was introduced 85.4 g. (0.0041 mole) of polyisobutylene triethylene tetramine (made from a mixture of alkylene polyamines, being predominantly triethylene tetramine), the flask flushed with nitrogen and the mixture heated to 120° C. while maintaining a slight nitrogen stream through the amine. When the indicated temperature was reached, a solution of 4.61 g. (0.014 mole) of triethyl 2,4,6-triazine triacetate in 80 ml. of xylene was added. The mixture was then stirred for 20 minutes and the xylene stripped in vacuo, the temperature being raised to 149° C. The temperature was maintained for one hour after the xylene had been removed and then raised to 160° C., this temperature being maintained for 0.5 hour. The residue weighed 88.6 g. Analysis: Percent N, 2.97, 2.98; percent basic N, 1.41, 1.40.

*Example V*

Into a reaction vessel was charged 76.0 g. (0.020 mole) of polyisobutylene tetraethylene pentamine (made from a mixture of alkylene polyamines, being predominantly tetraethylene pentamine) and 76 ml. of xylene while maintaining a nitrogen atmosphere. The reaction mixture temperature was then raised to 70° C., at which time 2.2 g. (0.0065 mole) of triethyl 2,4,6-triazine triacetate was added. A nitrogen stream was maintained and the mixture heated to a fast reflux. This condition was maintained for 0.5 hour followed by reducing the pressure and stripping off the xylene. The pressure was finally reduced to 4–5 mm. Hg and the temperature raised to 149° C. The residue weighed 75.6 g. An infrared spectrum of the residue was consistent with the amide product. Analysis: Percent N, 1.72, 1.75; percent basic N, 0.93, 1.10.

*Example VI*

Into a reaction vessel was introduced 7.70 g. (0.031 mole) of the trimethyl ester of trimesic acid and 107 g. (0.084 mole) of polyisobutylene ethylene diamine, the mixture blanketed with nitrogen and a slow nitrogen stream maintained. The mixture was heated to 180° C. over a period of about one hour and held at that temperature for a second hour followed by raising the temperature to about 205° C. and maintaining it for about 4 hours. The mixture was then allowed to cool and the residue weighed, yielding 109.8 g. The infrared spectrum was consistent with the triamide product. Analysis: Percent N, 2.03, 2.00; percent basic N, 0.78, 0.76.

*Example VII*

Into a reaction flask in a nitrogen atmosphere was introduced 16.5 g. (0.06 mole) of triethyl nitrilo triacetate and 224 g. of polyisobutylene ethylene diamine (0.18 mole). The procedure of Example II was followed, yielding 227.8 g. Analysis: Percent N, 2.35, 2.35; percent basic N, 0.89, 0.90.

*Example VIII*

Into a reaction flask in a nitrogen atmosphere was introduced 502 g. (0.396 mole) of polyisobutylene ethylene diamine and 44.8 g. (0.132 mole) of triethyl 2,4,6-triazine triacetate, the amine being heated prior to the addition of the triacetate. Following the procedure of Example I, the product obtained weighed 525 g. Analysis: Percent N, 2.82, 2.82; percent basic N, 0.95, 0.95.

*Example IX*

Into a reaction vessel in a nitrogen atmosphere was introduced 510 g. (0.403 mole) of polyisobutylene ethylene diamine and 300 ml. of 1,4-dioxane. The mixture was stirred until homogeneous at which time 24.7 g. (0.134 mole) of cyanuric chloride in 250 ml. of 1,4-dioxane was added. While maintaining a nitrogen stream, the mixture was kept at reflux for 2 hours followed by stripping off the dioxane at atmospheric pressure, slowly raising the temperature to 175° C. Finally, the pressure was reduced to about 4–5 mm. Hg while maintaining the 175° C. temperature. The residue weighed 528 g.

To the residue was added 526 ml. of mixed hexanes with heating in order to obtain a homogeneous mixture. To the homogeneous solution was added 350 ml. of 95 percent alcohol, followed by heating the mixture to reflux and maintaining the reflux for about one-half hour. At the end of this time, 175 ml. of 25 percent aqueous sodium carbonate was added and the mixture stirred while being allowed to cool to room temperature. After allowing the mixture to settle into 2 layers, the aqueous layer was drawn off and discarded. The remaining layer, which was partly an emulsion layer and partly organic layer, was separated into 2 layers, the emulsive layer centrifuged, resulting in 2 layers, the upper layer being combined with the organic layer. The volatile solvents were then removed in vacuo, the organic mixture reaching a temperature of 130° C. The pressure was then further reduced to about 4–5 mm. Hg and the temperature raised ultimately to 150° C., maintaining the temperature and pressure for one hour. The final residue weighed 422 g. Analysis: Percent N, 3.12, 3.17; percent basic N, 1.22, 1.23; percent Cl, 1.2.

*Example X*

In a reaction vessel sparged with nitrogen was introduced 31.2 g. (0.09 mole) of triethyl 2,4,6-triazine triacetate and 320 g. (0.25 mole) of N-polyisobutylene ethylene diamine and the mixture heated to 300° F. while maintaining a nitrogen stream. After about 1 hour at the indicated temperature, the temperature was raised to 320° F. and maintained for 30 minutes. The mixture was allowed to cool, leaving a residue of 343 g. Analysis: Percent N, 2.93, 2.89; percent basic N, 0.99, 1.04. An infrared spectrum was consistent with the amide product.

*Example XI*

Into a reaction flask sparged with nitrogen was introduced 10.4 g. (0.031 mole) of triethyl 2,4,6-triazine triacetate and 100 g. (0.092 mole) of N-polyisobutylene ethylene diamine and the mixture slowly heated to 360° F. and maintained at that temperature for a total time of 1.5 hours, while maintaining a nitrogen stream. The reaction mixture was allowed to cool, leaving a residue of 107.2 g. An infrared spectrum was consistent with the amide product. Analysis: Percent N, 3.21, 3.29; percent basic N, 1.01, 1.09.

*Example XII*

Into a reaction flask having a nitrogen atmosphere was introduced 100 g. (0.08 mole) of N-polyisobutylene ethylene diamine and 6.70 g. (0.026 mole) of trimesic acid trimethyl ester and while maintaining a nitrogen stream in the reaction mixture, the temperature was raised to 250° F. and maintained for 2 hours. At the end of this time, the temperature was raised to 350° F. and maintained for about 4.5 hours. After allowing the mixture to cool, it was heated to 400° F. and maintained at that temperature for 4 hours. The mixture was then allowed to cool. An infrared spectrum of the residue was consistent with the amide product. Analysis: Percent N, 2.03, 2.05; percent basic N, 0.78, 0.82.

*Example XIII*

Into a reaction flask sparged with nitrogen was introduced 23.1 g. (0.092 mole) of trimesic acid trimethyl ester and 300 g. (0.28 mole) of N-polyisobutylene ethylene diamine and the mixture heated to 350° F. over a period of 1 hour and maintained at that temperature for 1 hour while a stream of nitrogen was maintained through the mixture. The temperature was then raised to 400° F. and maintained for 4 hours. At the end of this time the reaction mixture was cooled, the residue weighing 314.3 g. An infrared spectrum of the product was consistent with the amide structure. Analysis: Percent N, 2.29, 2.21; percent basic N, 0.91, 1.00.

As has already been indicated, the compositions of this invention find use as detergents in lubricating oil. They are found to be effective over a wide variety of conditions: not only under the hot conditions of the diesel engine, but the much more variable temperature conditions of the automobile engine.

The compositions of this invention may be formulated with various lubricating fluids (hereinafter referred to as oils) which are either derived from natural or synthetic sources. Oils generally have viscosities of from about 35 to 50,000 Saybolt Universal Seconds (SUS) at 100° F. Among natural hydrocarbonaceous oils are paraffin base, naphthenic base, asphaltic bas and mixed base oils. Illustrative of synthetic oils are: hydrocarbon oils such as polymers of various olefins, generally of from 2 to 8 carbon atoms, and alkylated aromatic hydrocarbons; and nonhydrocarbon oils, such as polyalkylene oxides, aromatic ethers, carboxylate esters, phosphate esters, and silicon esters. The preferred media are the hydrocarbonaceous media, both natural and synthetic.

The above oils may be used individually or together whenever miscible or made so by the use of mutual solvents.

When the detergents of this invention are compounded with lubricating oils for use in an engine, the detergents will be present in at least about 0.1 weight percent and usually not more than 20 weight percent, more usually in the range of about 1 to 10 weight percent. The compounds can be prepared as concentrates due to their excellent compatibility with oils. As concentrates, the compounds of this invention will generally range from about 10 to 70 weight percent, more usually from about 20 to 50 weight percent of the total composition.

A preferred aspect in using the compounds of this invention in lubricating oils is to include in the oil from about 1 to 50 mM./kg. of a dihydrocarbyl phosphorodithioate, wherein the hydrocarbyl groups are from about 4 to 36 carbon atoms. Usually, the hydrocarbyl groups will be alkyl or alkaryl groups. The remaining valence of the phosphorodithioate will usually be satisfied by zinc, but polyalkyleneoxy or a third hydrocarbyl group may also be used. (Hydrocarbyl is an organic radical composed solely of carbon and hydrogen which may be aliphatic, alicyclic, or aromatic.)

Other additives may also be included in the oil such as pour point depressants, oiliness agents, antioxidants, rust inhibitors, etc. Usually, the total amount of these additives will range from about 0.1 to 10 weight percent, more usually from about 0.5 to 5 weight percent. This individual additives may vary from about 0.01 to 5 weight percent of the composition.

In order to demonstrate the excellent effectiveness of the compounds of this invention as detergents and dispersants in lubricating oils, a number of the compounds were tested in a 1–G Caterpillar test (MIL–L–45199 conditions). The oil used was a Mid-Continent SAE 30 oil and 12 mM./kg. of zinc di(alkylphenyl)phosphorodithioate (the alkyl groups were polypropylene of about 12 to 15 carbon atoms) was included. The following table indicates the particular derivative used, the amount used, the time for which the run was carried out and the results. Also included are the results for the base oil containing the phosphorodithioate for comparison.

TABLE I

| Detergent Ex. | Wt. Percent | Hours | Rating | |
|---|---|---|---|---|
| | | | Groove Deposits | Land Deposits |
| I[1] | 9.35 | 120 | 8-5-0-0 | 116-10-0 |
| | | 180 | 7-7-0.1-0.1 | 310-45-10 |
| II | 3.94 | 60 | 23-5-0-0 | 115-15-10 |
| | | 120 | 66-8-0.1-0.2 | 320-30-30 |
| III | 3.72 | 60 | 20-3-0-0 | 105-10-5 |
| | | 120 | 55-12-0-0 | 395-10-5 |
| X | 3.18 | 60 | 2.7-0.2-0-0 | 20-0-0 |
| XI | 0.89 | 120 | 47-8-0-0 | 300-10-5 |
| XII | 0.83 | 60 | 13-1-0-0 | 95-15-5 |
| XIII | 2.52 | 120 | 48-5-0-0.1 | 315-20-20 |

[1] 18 mm./kg. of the zinc phosphorodithioate was used.

To demonstrate the effectiveness of the compositions of this invention in an automobile internal combustion engine, a modified FL–2 test procedure, as described in June 21, 1948, report of the Coordinating Research Council was employed. A standard procedure requires the maintenance of a jacket temperature of 95° F. and a crankcase oil temperature of 155° F. at 2,500 r.p.m. and 45 brake horsepower for a period of 40 hours (closely simulating the relatively "cold" engine conditions which are normally experienced in city driving). At the end of each test, the engine is dismantled and the amount of sludge (rating of 0 to 50, no sludge being 50) and varnish (rated in the same way) is determined. Also determined is ring clogging reported as percent ring clogging.

The above test was modified by increasing the time and periodically raising the oil sump temperature from 165° F. to 205° F. and the water jacket temperature from 95° F. to 170° F.

Using a Mid-Continent SAE 30 base stock, each candidate detergent was employed at approximately the same concentration; also included in the oil was 10 mM./kg. of zinc, O,O-di(alkyl)dithiophosphate (alkyl of from 4 to 6 carbon atoms) and 2 mM.kg. of zinc O,O-di(alkylphenyl) dithiophosphate (alkyl is polypropylene of from 12 to 15 carbon atoms). The following table indicates the results obtained. For comparison, without the additive, the engine is incapable of running after about 12 hours.

TABLE II.—MODIFIED FL-2 TEST DATA

| Detergent Example | Wt. Percent | Hours | Total Varnish | Total Sludge | Percent Clogging | |
|---|---|---|---|---|---|---|
| | | | | | Rings | Screens |
| VI | 1.05 | 80 | 25 | 34 | 75 | 2 |
| VII | 1.2 | 60 | 22 | 32 | 93 | 2 |
| VIII | 1.14 | 60 | 22 | 40 | 18 | 3 |
| IX | 1.26 | 60 | 14 | 36 | 75 | 15 |

It is evident from the above results that the compositions of this invention are excellent detergents and dispersants in lubricating oils under the varying conditions of different types of internal combustion engines. The compositions of this invention are stable for very long periods of time under the extremely hot conditions of the diesel engine. By contrast, they are able to maintain sludge dispersed in oil under the relatively "cold" conditions of the internal combustion engine. The detergents of this invention greatly enhance lubricant protection over the presently available detergents which provide excellent detergency. The useful life of the lubricating oil is thus greatly extended.

As will be evident to those skilled in the art, various modifications on this invention can be made or followed, in the light of the foregoing disclosure and discussion, without departing from the spirit or scope of the disclosure or from the scope of the following claims.

We claim:
1. A composition of the formula:

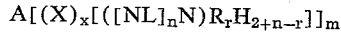

$$A[(X)_x[([NL]_nN)R_rH_{2+n-r}]]_m$$

wherein A is a polyvalent organic radical selected from the group consisting of: (1) aliphatic and cyclic hydrocarbon radicals having from about 3 to 15 carbon atoms and (2) heterocyclic radicals having from 5 to 7 annular members and consisting of from 1 to 3 nitrogen atoms, 3 to 15 carbon atoms, and hydrogen in number necessary to satisfy any unsatisfied valences; X is non-oxo carbonyl or imino; $x$ is an integer of from 0 to 1; L is an alkylene group of from about 2 to 6 carbon atoms; $n$ is an integer of from 1 to 6; R is an aliphatic hydrocarbon radical of from about 30 to 350 carbon atoms; $r$ is an integer of from 1 to 2; and $m$ is an integer of from 2 to 4.

2. A composition according to claim 1, wherein $m$ is 3.
3. A composition according to claim 1, wherein $x$ is 0.
4. A composition according to claim 1, wherein $x$ is 1.
5. A composition of the formula:

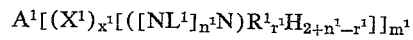

$$A^1[(X^1)_{x^1}[([NL^1]_nN)R^1_rH_{2+n^1-r^1}]]_{m^1}$$

wherein $A^1$ is a polyvalent organic radical selected from the group consisting of: (1) aliphatic and cyclic hydrocarbon radicals having from about 3 to 10 carbon atoms, and (2) heterocyclic radicals having from 5 to 7 annular members and consisting of from 1 to 3 nitrogen atoms, 3 to 10 carbon atoms, and hydrogen in number necessary to satisfy any unsatisfied valences, $X^1$ is non-oxo carbonyl, $x^1$ is an integer of from 0 to 1, $L^1$ is an alkylene group of from 2 to 3 carbon atoms, $n^1$ is an integer of from 1 to 5, $R^1$ is an aliphatic hydrocarbon radical of from 400 to 3,000 molecular weight, $r^1$ is an integer of from 1 to 2, and $m^1$ is an integer of from 2 to 4.

6. A composition according to cliam 5, wherein $x^1$ is 0, $R^1$ is a branched chain aliphatic hydrocarbon radical of from about 750 to 3,000 molecular weight and $r^1$ is about 1.

7. A composition according to claim 5, wherein $A^1$ is a polyvalent aliphatic radical of from about 3 to 12 carbon atoms.

8. A composition according to claim 5, wherein $A^1$ is a polyvalent carbocyclic ring of from 5 to 8 annular members.

9. A composition according to claim 5, wherein $A^1$ is a polyvalent heterocyclic radical having from 1 to 3 nitrogen annular members and a total of from 5 to 7 annular members.

10. A lubricating oil composition comprising an oil of lubricating viscosity and in a sufficient amount to provide detergency and dispersancy a composition according to claim 1.

References Cited

UNITED STATES PATENTS

| | | | |
|---|---|---|---|
| 3,182,024 | 5/1965 | Stuart et al. | 252—50 |
| 3,275,554 | 9/1966 | Wagenaar | 252—50 |
| 3,298,955 | 1/1967 | Strang | 252—51.5 |

DANIEL E. WYMAN, *Primary Examiner.*

PATRICK P. GARVIN, *Examiner.*